Patented Mar. 27, 1928.

1,663,725

UNITED STATES PATENT OFFICE.

JOSEPH BARON PAYMAN AND HARRY WIGNALL, OF BLACKLEY, MANCHESTER, ENGLAND, ASSIGNORS TO BRITISH DYESTUFFS CORPORATION LIMITED, OF BLACKLEY, MANCHESTER, ENGLAND.

MANUFACTURE OF SULPHONAMIDES OF 2.3-HYDROXYNAPHTHOIC ARYLIDES.

No Drawing. Application filed September 15, 1927, Serial No. 219,807, and in Great Britain September 20, 1926.

Our invention concerns the production of sulphonamides of the 2:3-hydroxynaphthoic arylide series. We have discovered that when 2:3-hydroxynaphthoic acid is condensed in the presence of, e. g. phosphorus trichloride with an aromatic sulphonamide which contains in its molecule a primary or secondary amine group in addition to the sulphonamide grouping, a product is obtained having the probable structure:—

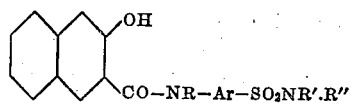

where R, R' and R" represent hydrogen or an organic radical, and may be the same or may differ amongst themselves. The 2:3-hydroxynaphthoic acid is apparently turned into its chloride wholly or in part and if desired, the reaction can be effected, starting from the chloride made separately.

The sulphonamide derivatives so prepared are valuable intermediates for the manufacture of dyes and pharmaceutical products.

As an example, which illustrates, without limiting, our invention, we describe hereafter the preparation of the meta sulphonamide derivative of 2:3-hydroxynaphthoic anilide, having the probable structure:—

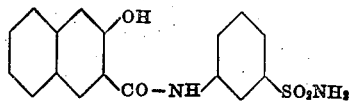

The parts are by weight.

A mixture of 188 parts of 2:3-hydroxynapthoic acid and 172 parts of aniline-$m$-sulphonamide is suspended in 870 parts of toluene, and with constant agitation is warmed to 60° C. At this temperature 60 parts of phosphorus trichloride are added, and the mixture is boiled under reflux for 10–12 hours. After cooling, diluting with water and making neutral with soda ash, toluene is distilled off in steam. The precipitated product is filtered off, washed and dried. It may be purified, if desired, by recrystallization from nitrobenzene.

The sulphonamide derivative so obtained is a pale yellow substance, melting at 278° C. after recrystallization from nitrobenzene. It is insoluble in water, but dissolves on the addition of sodium carbonate solution. Similar compounds are obtained when in place of aniline-$m$-sulphonamide in the above example, there is substituted aniline-$m$-sulphonanilide, $o$-toluidine-4-sulphonamide ($CH_3=1$), $p$-toluidine-3-sulphonanilide, methylaniline-$p$-sulphonamide, ethyl-$o$-toluidine-4-sulphonanilide, or the like.

What we claim and desire to secure by Letters Patent is:—

1. A process for the manufacture of amidosulphonarylamides of 2:3-hydroxynaphthoic acid having the formula

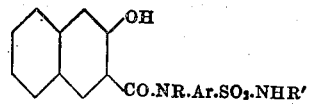

in which R and R' represent hydrogen or a hydrocarbon radical, and Ar represents a divalent aromatic residue, comprising the condensation of 2:3-hydroxynaphthoic acid with an aromatic sulphonamide containing as substituent a group .NHR in which R is hydrogen or a hydrocarbon radical, the condensation being effected by means of a substance capable of converting a carboxylic acid into the corresponding acid halide.

2. A process for the manufacture of amidosulphonarylamides of 2:3-hydroxynaphthoic acid having the formula

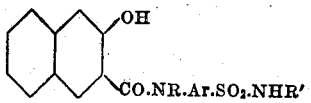

in which R and R' represent hydrogen or a hydrocarbon radical, and Ar represents a divalent aromatic residue, comprising the condensation of 2:3-hydroxynaphthoic acid with an aromatic sulphonamide containing as substituent a group .NHR in which R is hydrogen or a hydrocarbon radical, the condensation being effected in the presence of a diluent by means of a substance capable of converting a carboxylic acid into the corresponding acid halide.

3. A process for the manufacture of amido sulphonarylamides of 2:3-hydroxynaphthoic acid having the formula

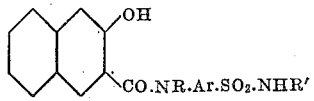

in which R and R' represent hydrogen or a hydrocarbon radical, and Ar represents a divalent aromatic residue, comprising the condensation of 2:3-hydroxynaphthoic acid with an aromatic sulphonamide containing as substituent a group .NHR in which R is hydrogen or a hydrocarbon radical, the condensation being effected in the presence of a diluent by means of a phosphorus halide.

4. A process for the manufacture of amido-sulphonarylamides of 2:3-hydroxynaphthoic acid having the formula

in which R and R' represent hydrogen or a hydrocarbon radical, and Ar represents a divalent aromatic residue, comprising the condensation of 2:3-hydroxynaphthoic acid with an aromatic sulphonamide containing as substituent a group .NHR in which R is hydrogen or a hydrocarbon radical, the condensation being effected in the presence of a diluent by means of a phosphorus trichloride.

5. A process for the manufacture of amido-sulphonarylamides of 2:3-hydroxynaphthoic acid having the formula

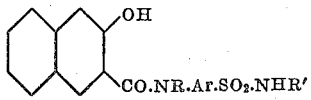

in which R and R' represent hydrogen or a hydrocarbon radical, and Ar represents a divalent aromatic residue, comprising the condensation of 2:3-hydroxynaphthoic acid with an aromatic sulphonamide containing as substituent a group .NHR in which R is hydrogen or a hydrocarbon radical, the condensation being effected in the presence of toluene by means of a phosphorus trichloride.

6. A process for the manufacture of amido-sulphonarylamides of 2:3-hydroxynaphthoic acid having the formula

in which R and R' represent hydrogen or a hydrocarbon radical, and Ar represents a divalent aromatic residue, comprising the condensation of 2:3-hydroxynaphthoic acid with an aromatic sulphonamide containing as substituent a group .NHR in which R is hydrogen or a hydrocarbon radical, the condensation being effected by first converting the 2:3-hydroxynaphthoic acid into its acid chloride and then treating the latter with the aromatic sulphonamide.

7. A process for the manufacture of amido-sulphonarylamides of 2:3-hydroxynaphthoic acid having the formula

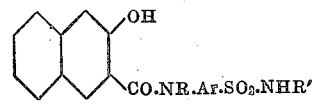

in which R and R' represent hydrogen or a hydrocarbon radical, and Ar represents a divalent aromatic residue, comprising the condensation of 2:3-hydroxynaphthoic acid with an aromatic sulphonamide containing as substituent a group .NHR in which R is hydrogen or a hydrocarbon radical, the condensation being effected by first converting the 2:3-hydroxynaphthoic acid into its acid chloride and then treating the latter with the aromatic sulphonamide in the presence of a diluent.

8. A process for the manufacture of amido-sulphonarylamides of 2:3-hydroxynaphthoic acid having the formula

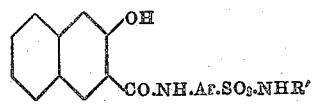

in which R' represents hydrogen or a hydrocarbon radical, and Ar represents a divalent aromatic residue of the phenylene type, comprising the condensation of 2:3-hydroxynaphthoic acid with an aromatic sulphonamide containing a free amino group as substituent, the condensation being effected in the presence of a diluent by means of a phosphorus halide.

9. As new products, amido sulphonarylamides of 2:3-hydroxynaphthoic acid having the formula

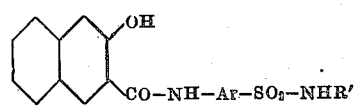

in which R' represents hydrogen or a hydrocarbon radical, the said products being pale coloured solids, obtainable in crystalline form, insoluble in water, soluble in solutions of sodium hydroxide or carbonate, soluble also in nitrobenzene, and hydrolyzed when boiled with caustic alkali giving an amine, NH$_2$R', and a sulphonated 2:3-hydroxynaphthoic arylamide.

10. As a new product 2:3-hydroxynaphthoic m-amidosulphonanilide, having the formula

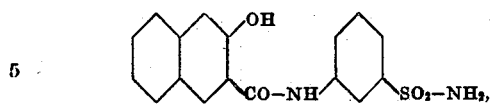

which is a pale yellow crystalline powder, melting at 278° C., insoluble in water, soluble in solutions of sodium hydroxide or carbonate, soluble also in nitrobenzene, from which it may be crystallized, and hydrolyzed when boiled with caustic alkali giving ammonia and 2:3-hydroxynaphthoic m-sulphonanilide.

In testimony whereof we have signed our names to this specification.

JOSEPH BARON PAYMAN.
HARRY WIGNALL.